April 3, 1951 W. H. JUDSON 2,547,867
PLANTING MACHINE

Filed March 2, 1948 2 Sheets-Sheet 1

INVENTOR
WILLIAM HADDON JUDSON
BY
Barr, Borden & Fry
ATTORNEY

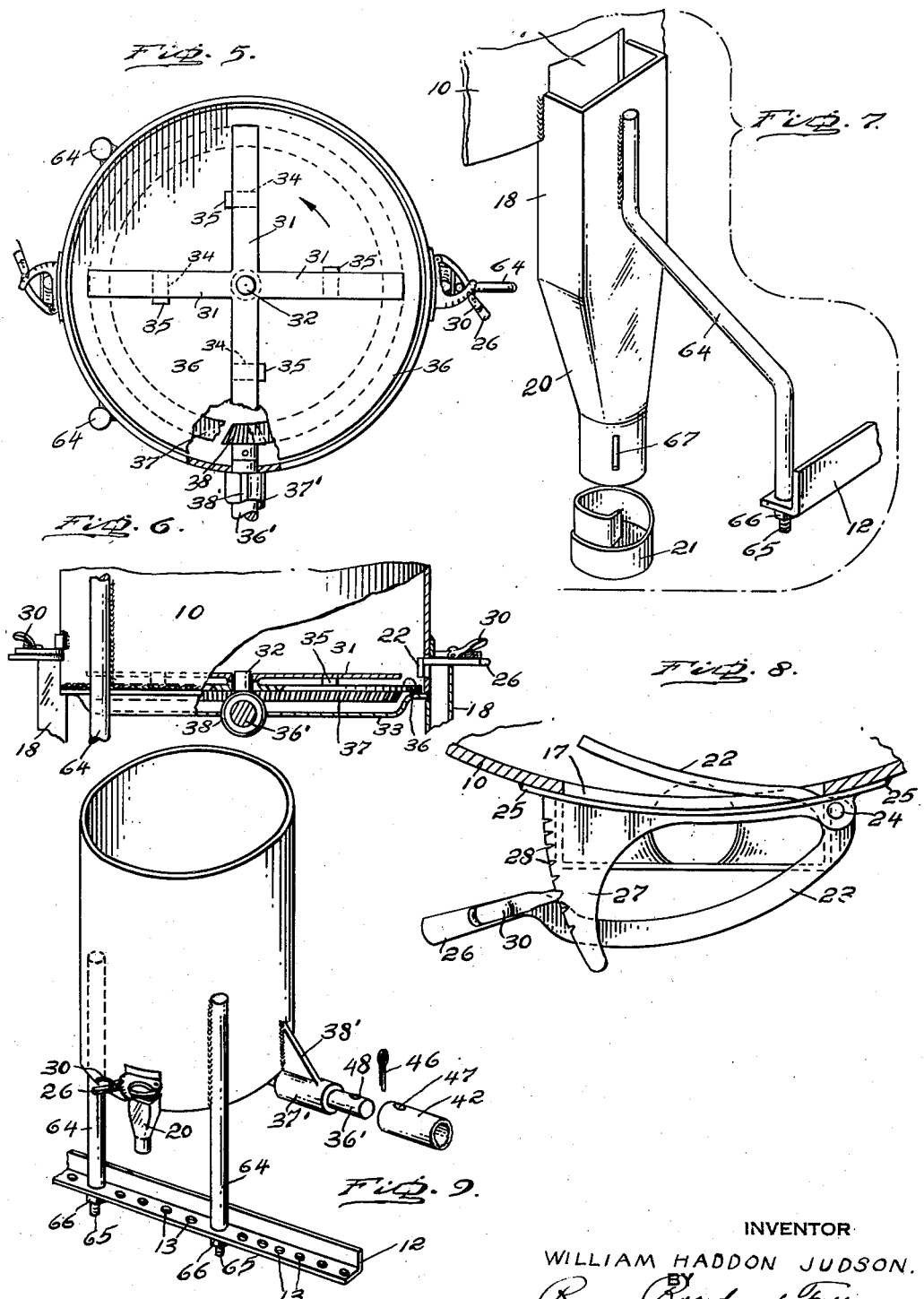

Patented Apr. 3, 1951

2,547,867

UNITED STATES PATENT OFFICE 2,547,867

PLANTING MACHINE

William Haddon Judson, Haverford, Pa., assignor to Charles A. Judson, Philadelphia, Pa.

Application March 2, 1948, Serial No. 12,643

3 Claims. (Cl. 275—9)

The present invention relates to agricultural equipment and more particularly to a novel agricultural implement including as a part thereof a distributor operable in association with the power take-off of a tractor.

Heretofore, material distributors have been made and sold as individual units arranged to be drawn across a field after the latter has been plowed, harrowed, or cultivated. This not only makes such distributor an additional piece of equipment, but increases the farmer's inventory, as well as presenting a problem of finding room for the same in a barn or other place of storage. Furthermore, where the distributor is used after a tilling operation there is no certainty that the material is spread where it will do the most good.

Some of the objects of the present invention are: to provide an improved material distributor for fertilizer, seed or the like; to provide a material distributor arranged for operation and to be controlled by the power take-off of a tractor; to provide a material distributor which is arranged to be operated in conjunction with a cultivator, plow, harrow or other soil tilling implement; to provide a novel material distributor arranged to be adjustably mounted upon an agricultural implement in order to discharge material where most needed; to provide a novel power transmitting mechanism for operation in association with a material distributor; to provide a power-transmitting mechanism for a material distributing unit wherein provision is made for replacing such mechanism as a unit; to provide a material distributing unit wherein the material is discharged in regulated quantities in close proximity to the soil tilling blades; and to provide other improvements as will hereinafter appear.

Figure 1:
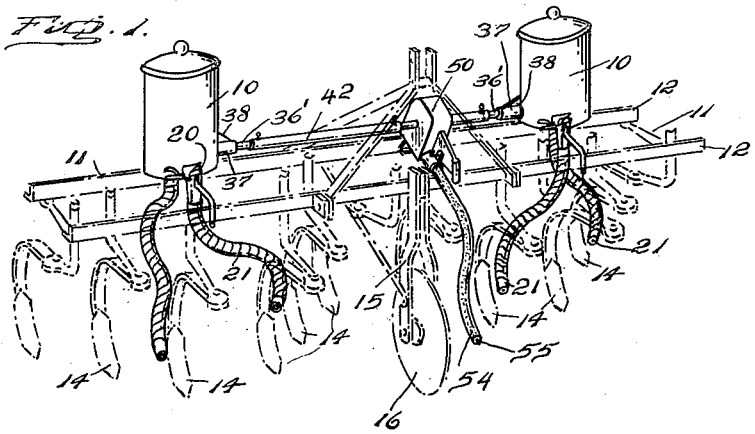
Figure 2:
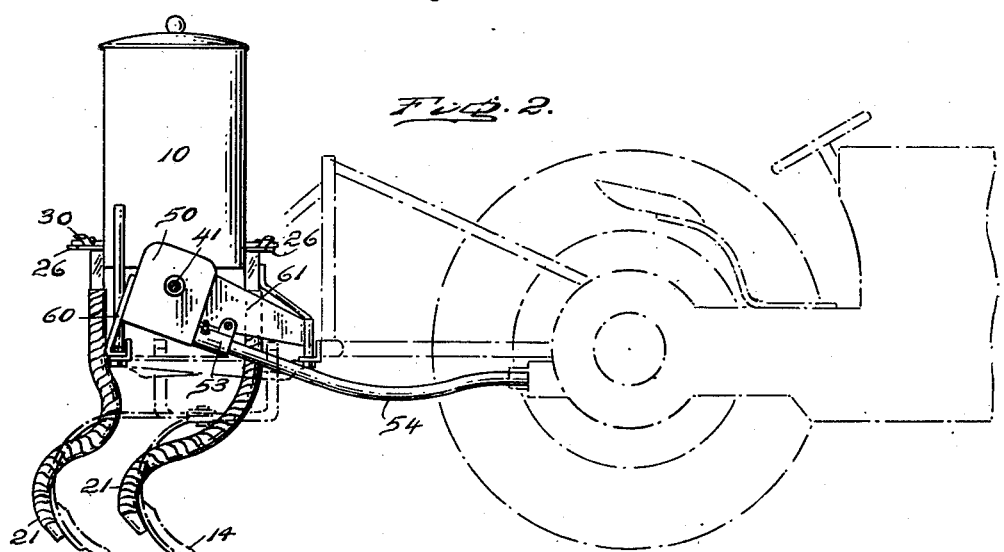
Figures 3, 4:
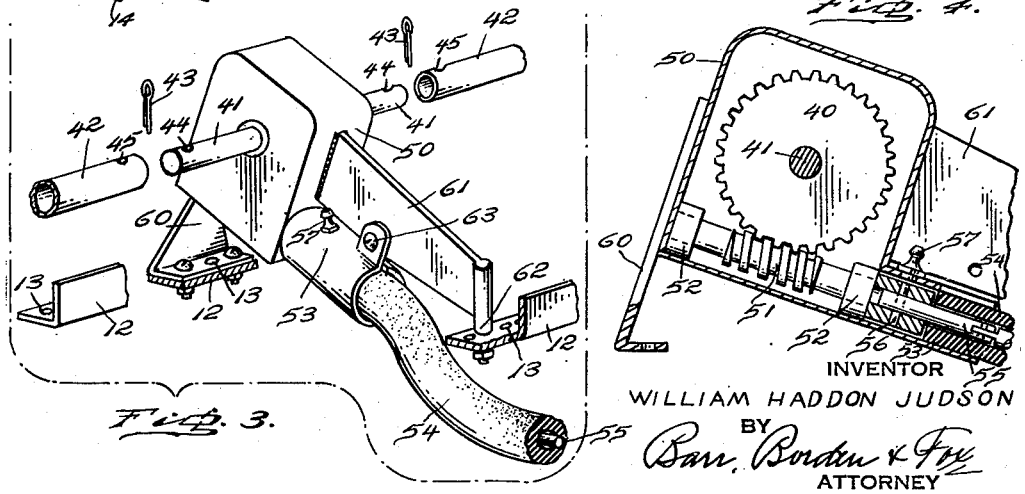

In the accompanying drawings Fig. 1 represents a perspective of a material distributor embodying one form of the invention in combination with one type of agricultural implement; Fig. 2 represents a transverse section taken between one of the hoppers and the gear box but showing in dotted lines a tractor from which the power take-off operates the distributor agitator; Fig. 3 represents an exploded perspective of the power take-off connection to the distributor; Fig. 4 represents a sectional detail of the gear box assembly and associated power take-off connection; Fig. 5 represents a plan of a material hopper with the cover removed; Fig. 6 represents a fragmentary elevation of the lower end of a distributor hopper showing the agitator mechanism; Fig. 7 represents an enlarged detail in perspective of the material discharge unit; Fig. 8 represents a detail in plan of the discharge valve of the distributor; and Fig. 9 represents a perspective of the hopper mounting of the distributor.

Referring to the drawings, one form of the present invention comprises a material distributor having a plurality of hoppers 10, illustratively mounted upon a cultivator 11, though other types of agricultural machines can be used which have or can be equipped with suitable supporting frames for the distributor. As shown, the cultivator 11 is of the type having longitudinally disposed spaced bars 12, each having a row of suitably spaced holes 13 to receive and support the cultivator blades 14, whereby the latter can be positioned in selected spaced relation according to requirements. As shown, this cultivator carries two sets of the blades 14, each arranged with three blades at each side and converging forwardly in V formation. Thus, the apex of each blade set can straddle a row of plants and work the ground on each side thereof. Between the two sets of blades there is a supporting skeleton structure carried by the main frame bars 12 and having a depending yoke 15 in which the support wheel 16 is journalled.

In order to discharge and guide material from the respective hoppers 10 to the most effective location, each hopper 10 is provided with two suitably located outlets 17, here shown as diametrically opposite and substantially coincident with the hopper bottom, and each communicating with a separate, downwardly disposed chute 18 terminating in a funnel 20 attached to and opening into a flexible metallic hose 21. The chute 18 is welded to the side of the hopper in proper operative relation to the outlet 17. In the preferred discharge position, each of the four hose 21 is shaped and positioned to discharge directly in the furrow as a cultivator blade 14 travels forwardly. It is preferable to proportion the discharge through the outlets 17 according to requirements, and for this purpose an adjustable shutter 22 is provided, the same being preferably formed in one piece with an arm 23 pivoted at 24 to a plate 25 welded to the hopper 10. The arm 23 terminates in a handle 26 which rides along the face of an extension 27 of the plate 25, such face being formed as an arc of which the pivot 24 is the center. A row of slots 28 is provided in the extension face to be engaged by a spring-pressed detent 30 slidably mounted upon the handle 26. In this way the shutter 22 can be adjusted to regulate the discharge flow of material, or closed entirely when the flow is to be cut off.

For breaking up, preventing caking, and ensuring free discharge of the material, two agitator cross bars 31 are loosely journalled on a fixed center pin 32 projecting upwardly from the hopper bottom 33. Lugs 34 project downwardly from the respective bars 31 into the path respectively of pusher lugs 35 upstanding from a cylindrical plate 36 arranged to rotate about the pin 32 and being driven by an integral ring gear 37 in mesh with a bevel pinion 38 keyed to a laterally extending stub shaft 36'. This stub shaft 36' is supported and journalled in a tube 37' held in true axial alinement by a web member 38' welded to the tube 37' and also to the side of the hopper 10. From the foregoing it will be seen that each hopper 10 agitating means is the same, except when assembled the projecting stub shafts 36' will be axially alined in opposed spaced apart relation.

As a common means for actuating the two agitators 31, of the respective hoppers 10, a gear 40 is provided, keyed to a driven shaft 41 and projecting at opposite sides thereof so that the respective ends can enter and form a telescopic connection with a sleeve link 42. The opposite end of each link 42 is arranged for telescopic connection to its adjacent alined stub shaft 36'. Motion is transmitted from the driven shaft 41 by means of cotter or shear pins 43, which pass through registered holes 44 and 45 in the respective shaft and links 42, while like pins 46 interconnect the other end of the link 42 with stub shaft 36' by passing through registered holes 47 and 48 in the respective parts. The gear driven shaft 41 is journalled in the sides of a gear box 50 and is driven through the gear 40 by means of a worm 51 which enters the gear box 50 at one side and is journalled in bearings 52. The projecting end of the worm 51 is housed in one end portion of a tubular extension 53 of the gear box 50 while the other end portion seats the end of the projecting flexible hose 54 within which a flexible shaft 55 is freely rotatable. One terminal end of the shaft 55 enters the worm 51, which is axially bored for coupling purposes, and is connected thereto for power transmission by a pin 56. It is preferable to provide a fitting 57 at this coupling for lubricating purposes. The other terminal of the flexible shaft 55 is arranged to be coupled to the power take-off of a tractor, as indicated in dotted lines of Fig. 2. The tractor is arranged to be connected to the cultivator or other implement by any suitable draw bar or connecting hitch, as indicated in dotted lines.

For rigidly supporting the gear box 50, one side thereof is welded to an upstanding bracket 60 bolted to one of the frame bars 12, while the opposite side has an arm 61 welded thereto and terminating in a bolt 62 arranged to be fastened to the opposite frame bar 12. By this bolted construction the gear box can be moved from one position to another according to selected positions of the hoppers 10. The gear box extension 53 is further stiffened by fastening an integral ear 63 thereof to the arm 61, as shown in Fig. 3.

As a means for mounting the hoppers 10 for adjustment to different locations lengthwise of the frame bars 12, a three point support is provided for each, comprising three downwardly disposed posts 64, and according to the present showing two of the posts are welded to one side of the hopper, while the third is welded to a discharge funnel on the opposite side and is outwardly angularly shaped to bring its end over the bar 12 opposite to that with which the other two posts are registered. In case the discharge funnels are differently located, all three posts will be welded directly to the hopper at the proper locations to register the posts with the spaced bars 12. Thus, two of the posts 64 will register with and seat on one bar 12, while the third post will register with and seat on one hole in the opposite bar 12. The spacing of the two posts 64 on the same side is such as to straddle a sufficient number of bar holes as will ensure a stable mounting for the hopper. Suitable nuts 66 anchor the posts 64 in any selected position.

One novel feature of the hopper construction resides in the means for interconnecting the discharge funnel 20 with the flexible metallic hose 21, and comprises forming a relatively short slot 67 lengthwise of the lower end of the funnel into which the bent end of the hose 21 is arranged to snap and thus unite the parts.

Another feature to be noted is the assembly of the gear box 50 which is formed of two parts pressed from sheet metal, arranged in edge to edge relation, and welded together after the moving parts have been properly assembled within the juxtaposed parts.

It will now be apparent that a complete unitary combined soil tilling implement and material distributor has been devised wherein one unit performs its function as propelled by a power tractor, and the other unit is caused to function through the medium of the power take-off of such tractor. The distributor comprises one or more hoppers arranged to contain fertilizer or seed which is so guided and controlled during discharge as to distribute the fertilizer directly into a furrow or furrows as the tilling implement travels over the ground. Likewise, corn or other seed can be most advantageously placed in the furrows instead of being promiscuously scattered over the ground. Furthermore, a self-contained power unit serves to supply power to drive the agitators of the respective hoppers, such unit having a shaft transmitting the power through cotter pins, which serve as shear pins to protect the mechanism against breakage. This cotter pin construction allows the power unit to be removed for repair or replacement without disturbing other parts of the hopper mechanism so that loss of use of the equipment in case of breakage is limited to the time required to obtain and connect a new power unit.

Having thus described my invention, I claim:

1. In a planting machine the combination of a pair of hoppers mounted upon said machine, each having a discharge outlet for material, agitator members respectively mounted in said hoppers, separate means for operating said agitators, each means including a stub shaft projecting toward and alined with the other stub shaft, a gear box including a shaft projecting at opposite sides of said box and into alinement with said stub shafts, removable coupling means including shear pins and sleeve links between said gear shaft and said stub shafts, and means including a driven shaft to supply power from the power take-off of a tractor to said gear box.

2. In a planting machine the combination of a pair of transversely aligned hoppers mounted upon said machine, each having a discharge outlet for material, agitator members respectively mounted in said hoppers, means for actuating said agitators respectively, each means including a laterally projecting stub shaft, said stub shafts being alined in opposed spaced apart relation, a gear box mounted on said machine between said hoppers and having a driven shaft projecting at opposite sides of said box in alined relation with said stub shafts, coupling tubes interposed respectively between said driven shaft and the respective stub shafts to join the parts in telescopic relation, removable shear pins between each coupling tube and said driven shaft and stub shaft, and means including a shaft for transmitting motion from the power take-off of a tractor to said gear box.

3. In a planting machine the combination of a pair of transversely aligned hoppers mounted upon said machine, each having a discharge outlet for material, means for regulating the discharge of said material, agitator members respectively mounted in said hoppers, means for actuating said agitators respectively, each means including a laterally projecting stub shaft, said stub shafts being alined in opposed spaced apart relation, a gear box mounted on said machine between said hoppers and having a driven shaft projecting at opposite sides of said box in alined relation with said stub shafts, coupling tubes interposed respectively between said driven shaft and the respective stub shafts to join the parts in telescopic relation, removable shear pins between each coupling tube and said driven shaft and stub shaft, and means including a shaft for transmitting motion from the power take-off of a tractor to said gear box.

WILLIAM HADDON JUDSON.

REFERENCES CITED

The following references are of record in the file of this patent:

UNITED STATES PATENTS

| Number | Name | Date |
| --- | --- | --- |
| 212,147 | Lucas | Feb. 11, 1878 |
| 784,659 | Butler | Mar. 4, 1905 |
| 873,673 | Mentzer | Dec. 10, 1907 |
| 961,290 | Faust | June 14, 1910 |
| 999,297 | Carter | Aug. 1, 1911 |
| 1,117,028 | Gelink | Nov. 10, 1914 |
| 1,387,265 | Henthorn | Aug. 9, 1921 |
| 1,656,831 | Rohlfsen | Jan. 17, 1928 |
| 1,751,928 | Lachner | Mar. 25, 1930 |
| 1,876,485 | Bormann | Sept. 6, 1932 |
| 1,948,668 | Kuchler | Feb. 27, 1934 |
| 2,006,653 | Riesinger | July 2, 1935 |
| 2,230,331 | Mobley | Feb. 4, 1941 |
| 2,250,073 | Weimer | July 22, 1941 |
| 2,323,278 | Silver | June 29, 1943 |
| 2,360,319 | Englund | Oct. 17, 1944 |